UNITED STATES PATENT OFFICE.

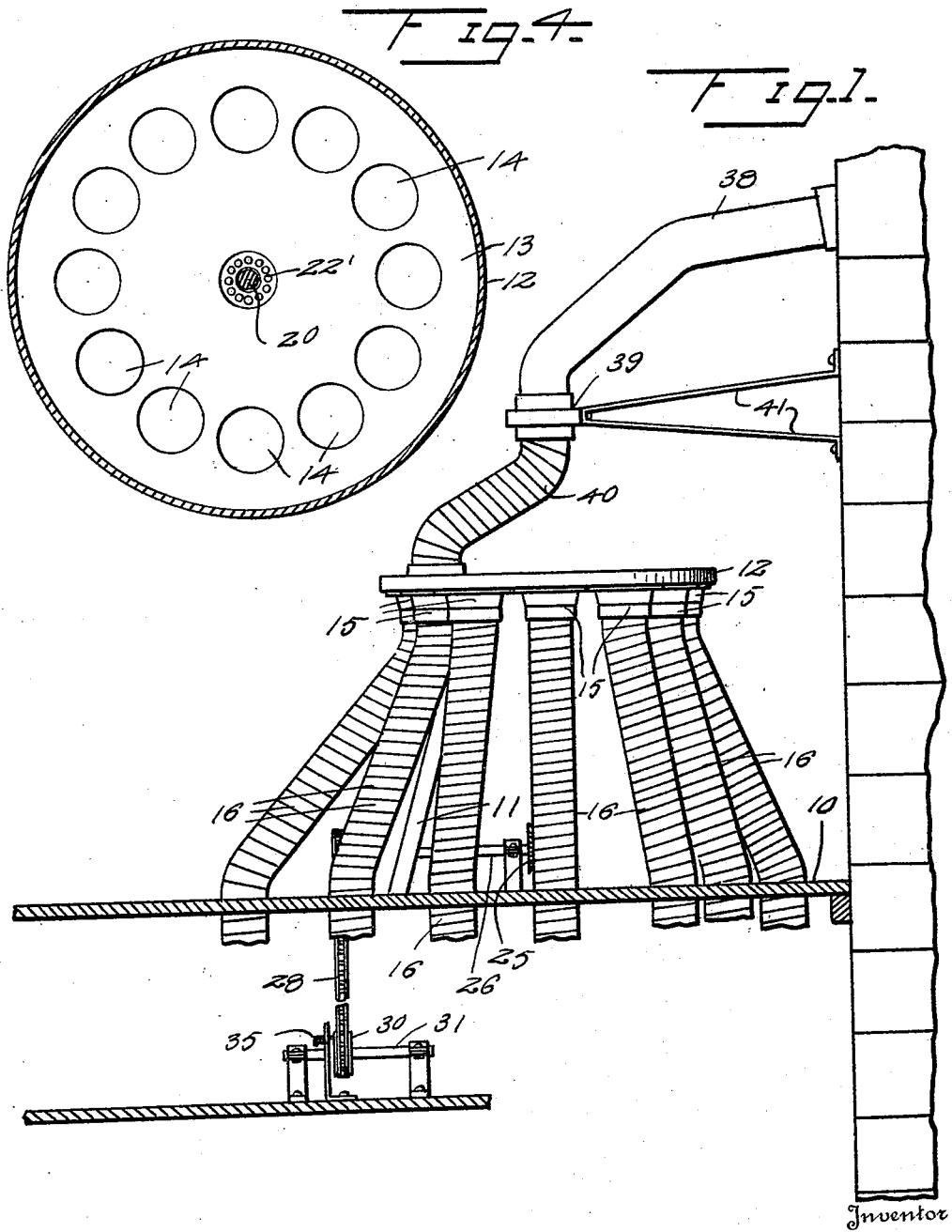

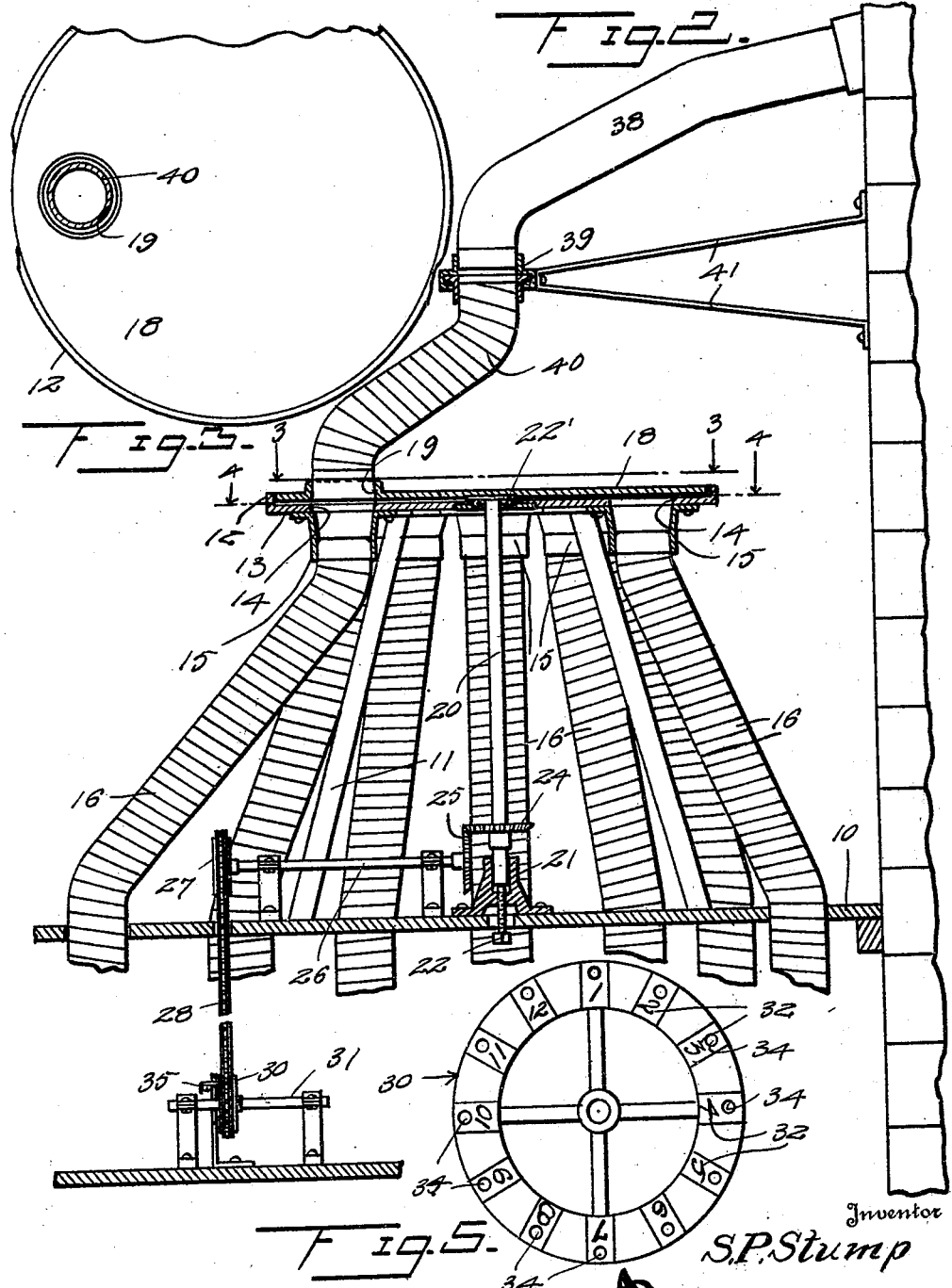

SAMUEL P. STUMP, OF MORRISON, ILLINOIS.

GRAIN-DISTRIBUTING DEVICE FOR ELEVATORS.

1,413,505.   Specification of Letters Patent.   Patented Apr. 18, 1922.

Application filed January 5, 1921. Serial No. 435,191.

*To all whom it may concern:*

Be it known that I, SAMUEL P. STUMP, a citizen of the United States, residing at Morrison, in the county of Whiteside and State of Illinois, have invented certain new and useful Improvements in a Grain-Distributing Device for Elevators; and I do hereby declare the following to be a full, clear, and exact description of the invention, such as will enable others skilled in the art to which it appertains to make and use the same.

This invention relates to a device for distributing grain in elevators, and one object is to provide means which may be installed within a cupola of any elevator, regardless of the arrangement of the bins and the shape of the cupola.

A further object is to provide a distributing head having its bottom formed with apertures in communication with discharge spouts leading to the various bins, and a rotatable element having particular connections and designed to be placed in communication with either bin, through the spout leading to that bin.

A still further object is to provide means for accurately controlling the position of the rotatable element, from a lower floor, so that the grain may be discharged to any bin desired.

A still further object is to provide, in connection with a spout leading from the mouth of the elevator,—a flexible spout, and a rotatable element having an opening therein adapted to register with any one of a series of openings corresponding with the bins to be filled, the lower end of the flexible spout being connected with the rotatable element and being shifted to the required position by the operation of the rotatable element, through the medium of suitable gearing.

With the foregoing and other objects in view, the invention consists in the novel construction, combination, and arrangement of elements hereinafter described and claimed, it being understood that modifications may be made within the scope of the claims without departing from the spirit of the invention.

In the accompanying drawings:

Figure 1 is a view in side elevation of a grain distributing device for elevators constructed in accordance with my invention.

Figure 2 is a view in vertical section of the device.

Figure 3 is a section taken on the horizontal plane indicated by the line 3—3 of Figure 2.

Figure 4 is a similar view taken on the horizontal plane indicated by the line 4—4 of Figure 2, and Figure 5 is a detail view of the actuating and indicating wheel and the means for securing it against accidental movement.

The floor of the cupola of a grain elevator is designated 10, and mounted therein on suitable support 11 is a distributing head 12 including a floor or bottom 13 having a series of apertures 14 therein. In communication with each aperture is a spout connection 15, which in turn communicates with a spout 16 leading to one of the bins, (not shown.) All of the bins are similarly connected, so that grain from the distributing head 12 may be discharged into any one of the bins, by the operation of suitable controlling mechanism.

The rotatable distributing plate 18 is provided with an aperture 19 adapted to register with any one of the openings 14 in the bottom of the distributing head. This plate 18 is carried by the upper end of a shaft 20 extending vertically and having its lower end mounted in bearing 21, vertical adjustment being secured by means of any suitable adjusting device, such as that shown at 22. The upper end, or upper portion of the shaft passes through bearing 22'.

The shaft 20 carries a gear wheel 24 meshing with another beveled gear wheel on the shaft 26, the outer end of the shaft last named carrying a sprocket wheel 27 rotated by a chain 28. The chain 28 passes around another sprocket wheel 30 located on a lower floor and mounted for rotation about an axis 31. Wheel 30 carries designations 32 on the face thereof, such as numerals corresponding with the various bins to be filled, and since the wheels 28 and 30 are of the same size, the distributing plate 18 will be rotated through the required angle for discharging the grain to a particular bin, when the indicating device represented by the numbered sprocket wheel is rotated through the angle determined by the designations on the wheel 30. An aperture 34 is provided opposite each number on wheel 30, and a spring held pin 35 mounted on a stationary element serves to retain the wheel or indicating device in position when this device is set manually.

The spout 38 leading from the mouth of the elevator, has connection by means of a swivel joint 39 with a flexible spout 40, the lower end of the latter being in communication with the opening 19 of the distributing plate 18. Braces 41 retain the lower end of the spout 38 in a position immediately over the central portion of the plate 18, and the distance between the swivel joint and all of the openings 14 in the bottom of the distributing head is the same, and flexible spout 40 will remain taut under all conditions. The arrangement of the operative elements connected with the hopper is such that it is practically impossible for the apparatus to get out of working order, and reliability of control from the lower floor is assured.

Having thus described the invention, what I claim is:—

1. In a device of the class described, a distributing head having a series of openings arranged in circular form in the bottom thereof, a plate having a single opening adapted for registration with any of the openings first named, the center of the plate being in axial alignment with the center of the circle defined by the series of openings in the bottom of the distributing head, and a flexible spout in communication with the opening in the plate.

2. In a device of the class described, a distributing head having a series of openings in the bottom thereof, a distributing plate rotatable above the bottom of the hopper and provided with a single opening, a flexible spout in communication with the opening last named and adapted for communication with a stationary grain spout, a swivel connection between the spouts, a shaft to impart movement to the plate and said swivel connection being in alinement with the axis of said shaft.

In testimony whereof I affix my signature in presence of two witnesses.

SAMUEL P. STUMP.

Witnesses:
J. A. GEORGE,
HARVEY W. HOKE.